April 19, 1960
O. M. LEWIS
2,933,128
DEVICE FOR COLLAPSING AND REMOVING A VEHICLE WHEEL TIRE
Filed July 15, 1958
3 Sheets-Sheet 1
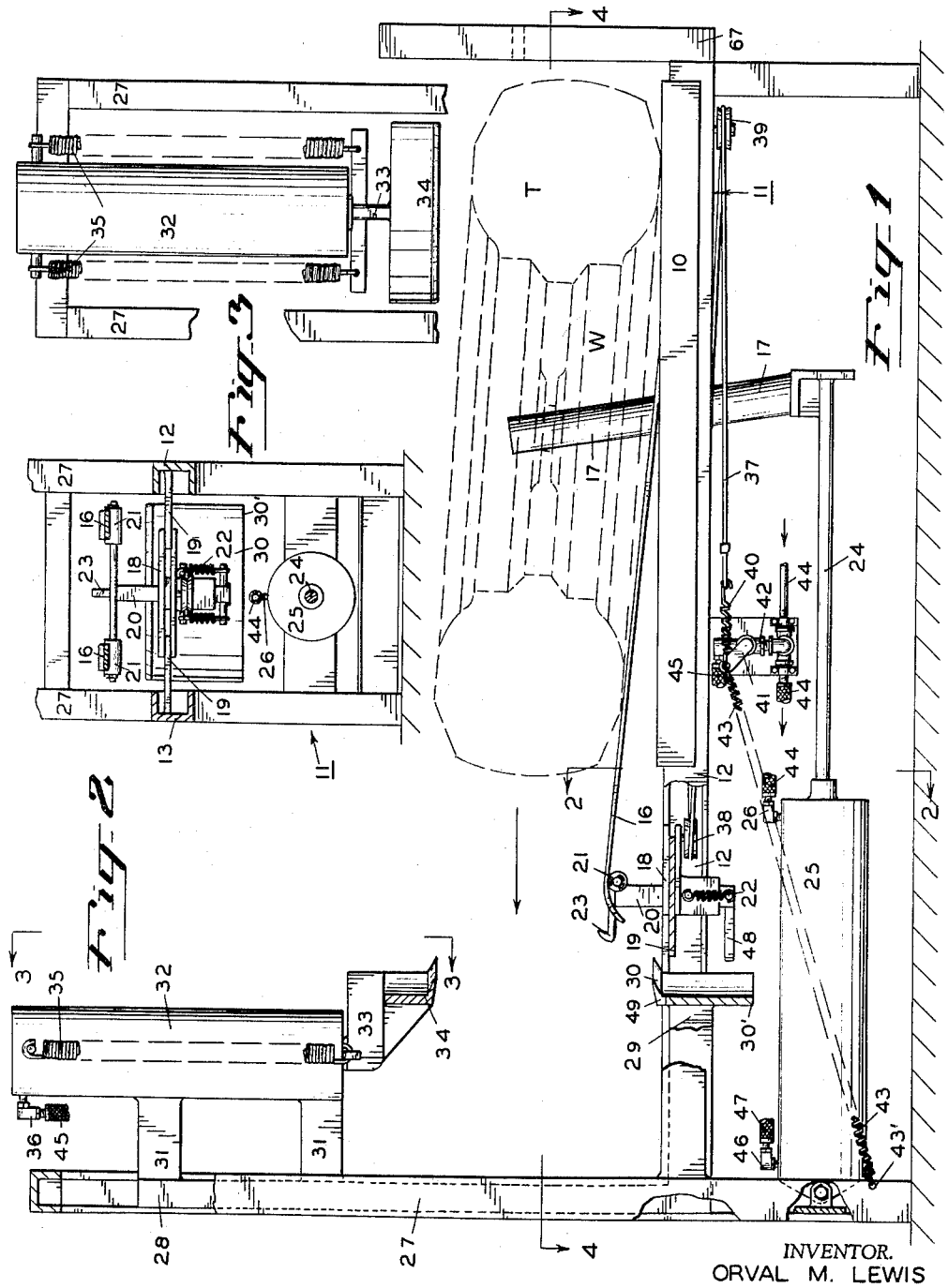
INVENTOR.
ORVAL M. LEWIS
BY
T.R.Geisler.
ATTORNEY

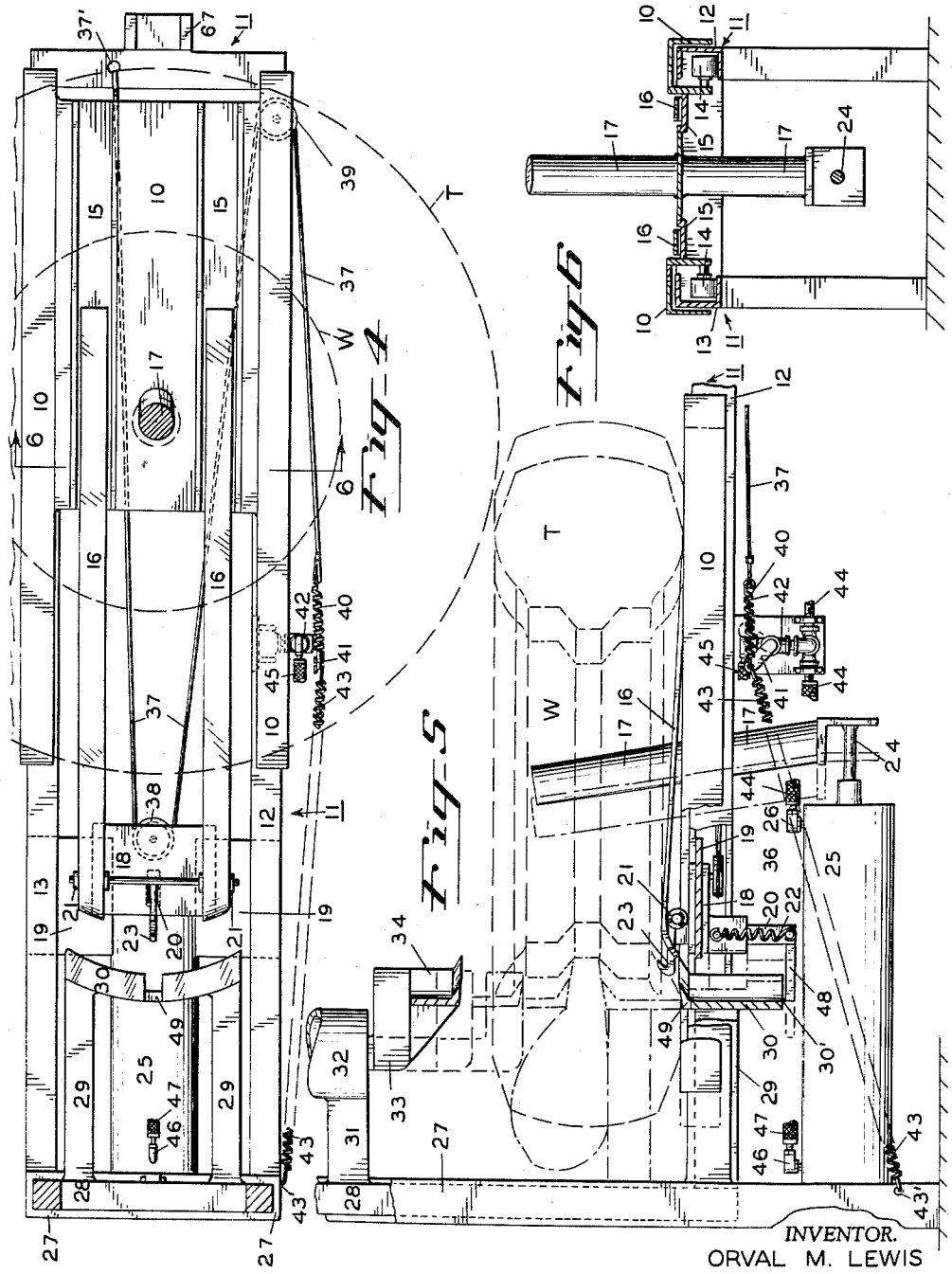

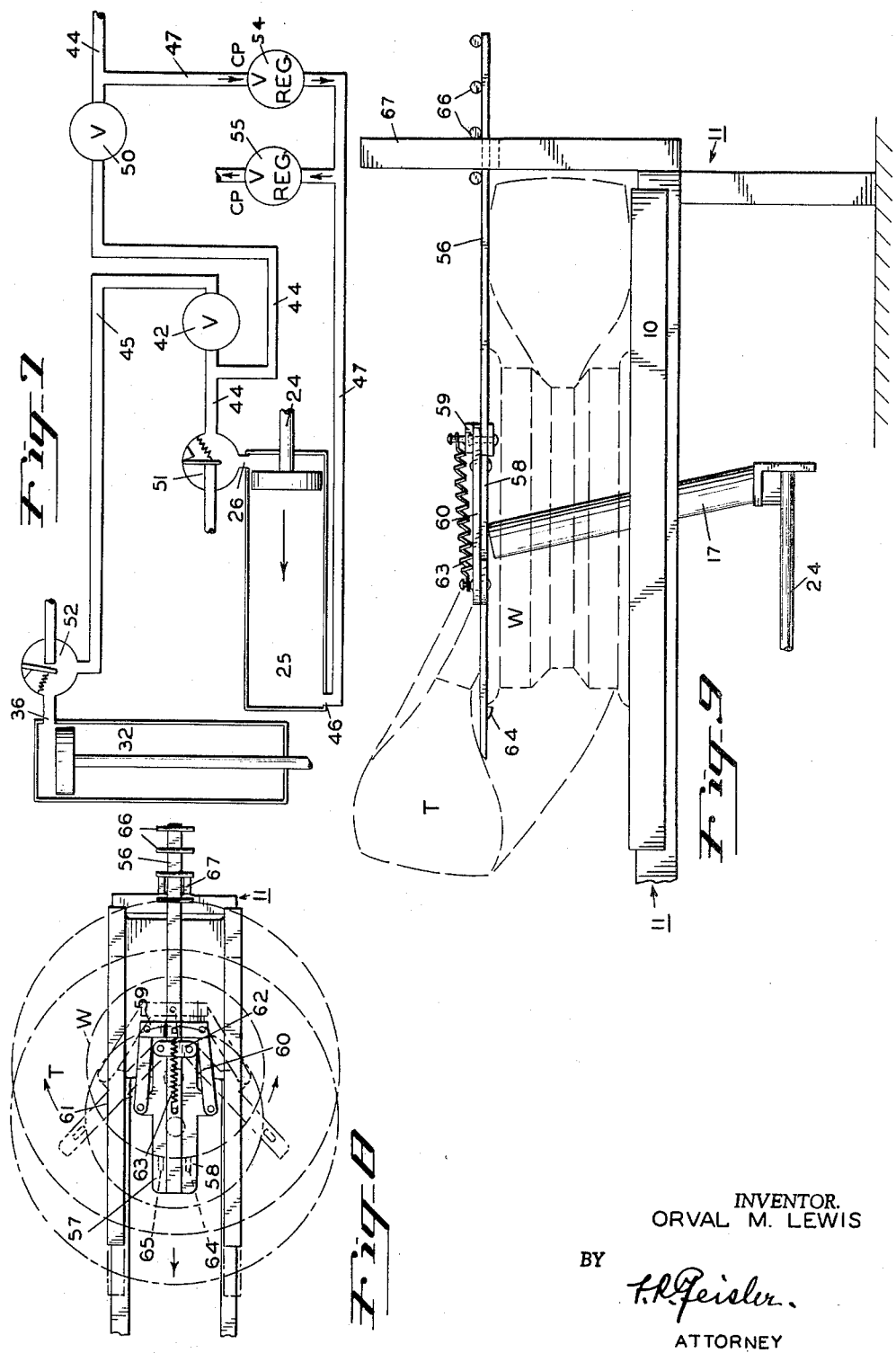

United States Patent Office 2,933,128
Patented Apr. 19, 1960

2,933,128

DEVICE FOR COLLAPSING AND REMOVING A VEHICLE WHEEL TIRE

Orval M. Lewis, Sweet Home, Oreg.

Application July 15, 1958, Serial No. 748,733

5 Claims. (Cl. 157—1.28)

This invention relates in general to the collapsing of a tire on a vehicle wheel and the subsequent removal of the tire entirely from the wheel.

More specifically, the invention relates to the loosening of the tire beads from the rim portions of the wheel, particularly the beads of a tubeless tire, as the first step in the removal of a tire and followed by the removal of the loosened tire from the wheel.

The loosening of the beads of the tire from the adjacent rim portions of the wheel, which of course is a necessary preparatory step in the removal of a tire, has heretofore often involved difficulty and considerable labor, and this has proved to be true especially in the case of the modern tubeless tires. As a result, several devices have recently been developed to facilitate this bead loosening operation. Most of these devices are capable of loosening only one bead at a time and therefore necessitate the repeating of the operation on the other side of the wheel should the other bead of the tire continue to remain firmly stuck to the rim portion on its side of the wheel.

An object of this invention is to provide improved tire bead loosening means which will loosen both beads simultaneously from their respective wheel rim portions, and in the case of a tubeless tire and "drop center" type of vehicle wheel, move both loosened beads into the "drop center" portion of the wheel.

Another object of the invention is to provide such tire bead loosening means which can be operated easily and quickly merely with the employment of air under pressure and thus be suitable for use in any garage or automobile service station equipped with the customary air hose and supply of air under pressure ordinarily employed for the inflating of vehicle tires.

A further object is to provide a compressed air operated device which will be capable not only of loosening both beads of the tire simultaneously but which, in combination with a simple additional and supplemental tool, will then also be capable of completely removing the loosened tire from the wheel as a second operational step accomplished similarly and easily with further employment of air under pressure.

An additional object of this invention is to provide an improved device which can be employed with tires of any size, without any possibility of injury to the tire, and which will not require any particular skill, any exertion, or any undue expenditure of time on the part of the operator.

The manner in which these objects and other incidental advantages are attained with the present invention and the construction and method of operation of the various parts of the device embodying this invention will be briefly described and explained with reference to the accompanying drawings.

In the drawings:

Fig. 1 is an elevation of the major portion of the device, with parts broken away for clarity, indicating in broken lines a vehicle wheel and tire placed on the device preparatory to the loosening of the tire beads in the first step of removing the tire;

Fig. 2 is a section taken through the device on line 2—2 in Fig. 1;

Fig. 3 is a fragmentary elevation taken on line 3—3 of Fig. 1;

Fig. 4 is a plan view and partial section on line 4—4 of Fig. 1 with the wheel and tire indicated by broken lines;

Fig. 5 is a fragmentary elevation and partial section corresponding in part to Fig. 1 but illustrating two subsequent positions of the device and of the wheel and tire during operation of the device;

Fig. 6 is a section on line 6—6 of Fig. 4;

Fig. 7 is a diagram showing the compressed air lines and controls by which the device is operated;

Fig. 8 is a plan view drawn to a smaller scale showing the supplemental tire removing tool used as part of the device after the loosening of the tire beads and illustrating its manner of operation; and Fig. 9 is an elevation illustrating the employment of the tire removing tool on the device with the vehicle wheel and the loosened tire thereon indicated in broken lines.

Referring first to Figs. 1, 4 and 6, a carriage 10 is slidably mounted on the horizontal portion of a stationary supporting frame assembly indicated in general by the reference 11. This portion of the supporting frame assembly includes a pair of parallel oppositely disposed channel members 12 and 13 (Fig. 6) which serve in part as tracks for the carriage 10. The carriage 10, preferably formed as shown best in Fig. 6, is provided with supporting rollers 14 which run in the channel members 12 and 13. The top face of the carriage 10 is formed with a pair of parallel guideways 15 (Figs. 4 and 6) in which the rear ends of a pair of flat bars 16 are slidable.

A center post 17 is rigidly secured to the carriage 10 and extends above and below the carriage. This post extends above the carriage a distance approximately equal to the thickness of an average vehicle wheel and extends through the hub of the vehicle wheel when the wheel is placed on the device for the loosening and removal of a tire. Preferably this post 17 is inclined slightly towards the left, as shown in Fig. 1, so that when the movement of the carriage and post forces the wheel and tire to move towards the left, as later explained, the inclination of the post will overcome any tendency of the wheel hub to slide upwardly on the post and become disengaged therefrom.

A separate, small forward carriage 18, (Figs. 1, 2 and 4) is slidable to a very limited extent on a pair of flat horizontal guide rails 19 secured on the main frame assembly 11. Limit stops (not shown) limit the movement of this carriage 18 to the right, as viewed in Figs. 1 and 4. A central vertical bracket 20 is supported on the carriage 18 and is slidable up and down in a suitable mounting sleeve. A pair of horizontal arms extend laterally at the top of the bracket 20 and carry the hinge mountings 21 for the forward ends of the flat bars 16. The flat bars 16 terminate shortly beyond their hinge mountings and are curved downwardly as shown in Fig. 1. The vertical bracket 20 is normally held in the raised position illustrated in Figs. 1 and 2 by a pair of coil springs 22. A central, forwardly-extending hook 23 is rigidly secured at the top of the bracket 20. This hook is adapted to engage the rim of the wheel as the wheel is moved from right to left on the device.

The lower end of the post 17 is connected to the outer end of a piston rod 24 of a piston located within a compressed air cylinder 25. Delivery of air into the cylinder 25 through the port 26 at the right hand end (as viewed in Fig. 1) causes movement of the piston, piston rod 24, post 17, carriage 10 and the wheel and tire on the carriage, towards the left, as indicated in Fig. 5.

The stationary main frame 11 has a pair of rigid upright guides 27 in which a bead thruster assembly is mounted for limited sliding movement in a vertical direction. This assembly comprises an integral frame 28 including a pair of bottom horizontal arms 29 (Fig. 4) which carry a lower tire bead thruster 30. This lower bead thruster 30 is curved, as shown in Fig. 4, to correspond approximately to the curvature of a wheel rim. The bead thruster has a top flange which is wedge shaped in cross section, as shown best in Fig. 1, and has a downwardly extending vertical wall 30'.

An upper pair of arms 31 (Fig. 1) on the frame 28 support a vertical air cylinder 32. A piston in the air cylinder 32 has a downwardly extending piston rod which carries a bracket 33 at its lower end on which is secured an upper bead thruster 34 similar to the lower bead thruster 30 and in substantial alignment with the lower bead thruster. A pair of coil springs 35, having their upper ends connected with the top of the cylinder 32 and their lower ends connected with the bracket 33, hold the piston, piston rod, bracket 33 and upper bead thruster 34 normally in raised position with respect to the cylinder 32 but permit them to be moved downwardly against the force of the springs 35 when compressed air is introduced into the top of the cylinder 32 through the port 36.

A small cable 37, shown in Figs. 1 and 4, having one end secured to the stationary main frame 11 at 37', passes around a pulley 38 on the carriage 18, thence around a pulley 39 secured to the main frame 11, and is connected through the medium of a coil spring 40 to an operating arm 41 for an air valve 42. A second coil spring 43, also connected to the arm 41, has its other end anchored to the stationary frame at 43'. An air hose 44 leads from a source of compressed air through a suitable control valve, mentioned later, to the port 26 of the lower cylinder 25. A branch air hose 45, connected with the air hose 44 by the valve 42, leads to the port 36 at the top of the upper cylinder 32. The coil spring 43 (Fig. 1) normally holds the valve 42 closed. The cylinder 25 is provided with a second air port 46 to which air under low pressure is delivered through an air hose 47, as later explained.

The operation of the device, as thus far described, briefly is as follows:

The vehicle wheel, indicated at W in broken lines in Fig. 1, with the tire T on the wheel, is placed on the carriage 10 with the post 17 extending up through the central hub portion of the wheel and with the left hand or forward portion of the tire resting on the flat bars 16. The carriage 10 is then in the extreme right or starting position shown in Fig. 1. Compressed air is delivered into the cylinder 25 from the hose 44 to the port 26. This causes the piston and cylinder 25, and consequently the piston rod 24, post 17, carriage 10, and the wheel and tire, all to be moved to the left. The bottom face of the forward end of the tire and the adjacent wheel rim slide along the bars 16 until the lower rim of the wheel comes into contact with the hook 23 of the bracket 20 on the front carriage 18. Further movement of the wheel now forces the front carriage 18 to start moving to the left. The slidable vertical bracket 20 on the front carriage 18 has a forwardly-extending arm 48 at the lower end, which, when the front carriage is moved to the left, then temporarily comes into engagement with the bottom wall 30' on the lower tire bead thruster 30 and consequently, for the time being, halts the movement of the front carriage 18 and of the wheel and tire, carriage 10, and piston rod 24.

This forward movement of the front carriage 18 by the engagement of the wheel rim with the hook 23 causes a pull on the cable 37 which results in movement of the valve operating arm 41 of the air valve 42. Air now begins to pass through the hose 45 into the top of cylinder 32. Since the piston rod 24 is temporarily held against further movement to the left, the supply of air will be diverted entirely to the upper cylinder 32. This causes the piston in cylinder 32, and therewith the piston rod, bracket 33, and upper bead thruster 34, to be moved downwardly against the force of the springs 35. When the downwardly moving upper bead thruster 34 reaches the tire it pushes the tire and wheel, and consequently the bracket 20 on the front carriage 18, downwardy against the force of the springs 22 until the forwardly-extending arm 48 is moved below and out of engagement with the lower edge of the wall 30' of the lower bead thruster 30 (see also Fig. 5). This releases the front carriage 18 and permits it, and with it the tire and wheel, carriage 10, piston rod and piston in cylinder 25, to resume their movement to the left, and, since air can now pass into both cylinders 25 and 32, the wheel on carriage 10 again starts to move further to the left while downward pressure on the upper bead thruster 34 continues.

The lower bead thruster 30 is provided with a central slot 49 (Fig. 4) to accommodate the hook 23 as the lower rim of the wheel is moved downwardly and forwardly and brought into contact with the lower bead thruster 30. The operating air pressure in the two cylinders 25 and 32 will by this time have become equal.

The forward movement of the wheel and the downward pressure of the top of the tire by the upper bead thruster 34 continue until both upper and lower bead thrusters are forced in between the respective wheel rims and the tire beads. Then any further movement of the wheel toward the left is prevented by the tire bead thrusters and consequently the piston rod 24 and the piston in cylinder 25 are again halted.

However, the pressure in upper cylinder 32 continues and since the downwardly moving upper bead thruster 34 encounters resistance in thrusting the upper tire bead downwardly from the adjacent wheel rim, the upwardly-slidable frame 28 together with the arms 29 and the lower bead thruster 30, will start to move upwardly until the pressure exerted by the two bead thrusters becomes equalized. Then the continued delivery of air into the upper cylinder 32 causes the two bead thrusters to move towards each other until the upper and lower beads of the tire have been moved into the drop center portion of the wheel as descried. When this occurs the operator stops the operation of the device by shutting off the air to the cylinders.

Referring now to the diagram of Fig. 7: The delivery of compressed air to the device from any suitable source through the air hose 44 is controlled by the main shut-off control valve 50, and when this valve is opened air is delivered into the right-hand end of cylinder 25 through the port 26. With the opening of valve 42, as previously explained, the compressed air also passes through the branch hose 45 into cylinder 32 through the port 36. When the air is turned off at the main valve 50 the cylinders exhaust through the instantaneous exhaust valves 51 and 52 respectively. However, air is allowed to enter the opposite end of cylinder 25 at all times through the hose 47 and the port 46 through the medium of a regulating valve 54 which is set for a constant low pressure, for example 10 pounds per square inch. Air from the left end of the cylinder 25 exhausts through a separate exhaust valve 55 which is set to exhaust at a slightly higher pressure, for example 12 pounds per square inch.

When the tire beads have been loosened and the operator shuts off the main control valve 50, the air delivered under low pressure into the cylinder 25 through port 46 causes the carriage 10 of the device to return to starting position.

Generally the loosening of both beads of the tire at one location on the wheel will be sufficient to enable the tire to be removed without difficulty. However, if the tire beads have become so firmly stuck on the remainder of the wheel rim peripheries that the loosening at one location is not sufficient, then the wheel is turned 180° and the bead loosening operation is repeated.

The removal of the tire from the wheel, after the tire beads have been loosened, is done very easily on the device with the assistance of an additional supplemental tool shown in Fig. 9. This tool consists of a flat central main bar 56 having a pair of flat arms 57 and 58 on opposite lateral sides located in the same plane and pivotally mounted on a cross bar 59 which is rigidly secured to the main bar 56. Links 60 and 61 connect lateral extensions of the arms with a slidably mounted cross head 62, this cross head being slidable on the main bar 56. A spring 63 pulls the slidable cross head toward the cross bar 59 and thus pulls the arms 57 and 58 normally against the edges of the main bar. The arms 57 and 58 have lugs 64 and 65 on their bottom faces for engaging the rim of the wheel.

For the removal of the tire, this supplemental tool is inserted vertically down between the loosened tire beads and the wheel and is then brought down into horizontal position on top of the wheel and thus into the position shown in Fig. 9. The right-hand end of the main bar 56, as viewed in the figure, carries spaced, rigidly mounted, transversely-extending holding rods 66 which are arranged for engagement with a pair of parallel vertical bars 67 rigidly mounted on the right-hand end of the main frame 11. With the wheel and the supplemental tool positioned then as shown in Fig. 9, the carriage 10 is again moved to the left. Since the main bar 56 is held against movement and since the lugs 64 and 65 on the arms 57 and 58 engage the upper rim of the wheel as the wheel moves to the left, the movement of the wheel to the left then forces the arms 57 and 58 to move in opposite directions around on the wheel rim. In doing this the arms 57 and 58 lift the tire up above the top rim of the wheel until the tire is freed from the wheel.

Minor modifications could be made in the supplemental tire removing tool and also could be made in parts of the main carriage 10, and front carriage 18, as well as in the main frame assembly 11 and the control connections for the air cylinders, without departing from the principle of the invention. However, the preferred form of the invention is considered to be that as illustrated and described, since the device when so constructed has been found to work very efficiently.

I claim:

1. In a device for collapsing a tire on a vehicle wheel preparatory to its removal from the wheel, a main frame, a wheel-supporting carriage mounted on said main frame for movement in a substantially horizontal direction, means for holding a vehicle wheel flat on said carriage, an upper and a lower tire bead thruster mounted on said main frame in vertical alignment with each other and normally spaced apart a distance greater than the thickness of a tire mounted on a vehicle wheel, means for moving said carriage and therewith the vehicle wheel on said carriage towards said bead thrusters, means for causing said bead thrusters to bear against opposite faces of the tire when said tire has been positioned between said bead thrusters and to thrust the tire beads inwardly towards the center of the wheel periphery, and a control for said last mentioned means automatically actuated by the moving of said wheel and tire into position for engagement of the tire by said bead thrusters.

2. In a device of the character described for collapsing a tire on a vehicle wheel preparatory to its removal from the wheel, a main frame assembly, a wheel-supporting carriage mounted on said main frame assembly for movement in a substantially horizontal direction, a post on said carriage arranged for engagement with the hub portion of a vehicle wheel placed flat upon said carriage for holding the wheel on said carriage, an upper and a lower tire bead thruster mounted on said main frame assembly in vertical alignment with each other and normally spaced apart a distance greater than the thickness of a tire mounted on a vehicle wheel, pneumatic means for moving said carriage and therewith the vehicle wheel on said carriage towards said bead thrusters, means automatically halting said movement of said wheel and carriage at such location as to bring the tire on said wheel between said bead thrusters, and pneumatic means for causing said bead thrusters to bear against opposite faces of the tire when said tire has been positioned between said bead thrusters and to thrust the tire beads inwardly towards the center of the wheel periphery.

3. In a device of the character described for collapsing a tire on a vehicle wheel preparatory to its removal from the wheel, a stationary main frame assembly, a wheel-supporting carriage mounted on said main frame assembly, a post on said carriage arranged for engagement with the hub portion of a vehicle wheel placed upon said carriage for holding the wheel flat on said carriage, an upper and a lower tire bead thruster mounted on said main frame assembly in vertical alignment with each other and normally spaced apart a distance greater than the thickness of a tire mounted on a vehicle wheel, said bead thrusters being curved to conform substantially to the curvature of a vehicle wheel rim, means for moving said carriage and therewith the vehicle wheel on said carriage towards said bead thrusters, means automatically halting said movement of said wheel and carriage at such location as to bring the tire on said wheel between said bead thrusters, means for causing said bead thrusters to bear against opposite faces of the tire when said tire has been positioned between said bead thrusters and to thrust the tire beads inwardly towards the center of the wheel periphery, and a control for said last mentioned means automatically actuated by the movement of said wheel and tire into position for engagement of the tire by said bead thrusters.

4. In a device of the character described, a main frame, a wheel-supporting carriage mounted on said main frame for movement in a substantially horizontal direction, means on said carriage arranged for engagement with the hub portion of a vehicle wheel placed upon said carriage for holding the wheel flat on said carriage, an upper and a lower tire bead thruster mounted on said main frame in vertical alignment with each other and normally spaced apart a distance greater than the thickness of a tire mounted on a vehicle wheel, said bead thrusters being curved to conform substantially to the curvature of a vehicle wheel rim, said bead thrusters having wedge-shaped tire bead engaging portions, means for moving said carriage and therewith the vehicle wheel on said carriage towards said bead thrusters, arresting means temporarily halting said movement of said wheel and carriage at such location as to bring the tire on said wheel between said bead thrusters, and means for causing said bead thrusters to bear against opposite faces of the tire when said tire has been positioned between said bead thrusters, said arresting means including an element for engaging a rim on said wheel and a second element for engaging one of said tire bead thrusters until relative movement of said latter mentioned tire bead thruster with respect to said tire brings said latter mentioned tire bead thruster into bearing engagement with a face of said tire, whereupon the disengagement of said second element with said latter mentioned tire bead thruster will cause said wheel to be moved forward further until said wedge-shaped portions of said bead thrusters have entered in between the tire beads and the respective rim flanges on said wheel.

5. In a device of the character described, a main frame assembly, a wheel-supporting carriage mounted on said main frame assembly for movement in a substantially horizontal direction, means for holding a vehicle wheel flat on said carriage, an upper and a lower tire bead thruster mounted on said main frame assembly in vertical alignment with each other and normally spaced apart a distance greater than the thickness of a tire mounted on a vehicle wheel said bead thrusters having wedge-shaped tire bead engaging portions, means for moving said carriage and therewith the vehicle wheel on said carriage towards said bead thrusters, arresting means temporarily halting said movement of said wheel and carriage at such location as to bring the tire on said wheel between said bead thrusters, means for causing said bead thrusters to bear against opposite faces of the tire when said tire has been positioned between said bead thrusters and to thrust the tire beads inwardly towards the center of the wheel periphery, said arresting means including an element for engaging a rim on said wheel and a second element for engaging said lower tire bead thruster until relative movement of said lower tire bead thruster with respect to said tire brings said lower tire bead thruster into bearing engagement with the lower face of said tire, whereupon the disengagement of said second element with said lower tire bead thruster will cause said wheel to be moved forward further until said wedge-shaped portions of said bead thrusters have entered in between the tire beads and the respective rim flanges on said wheel, means for returning said bead thrusters to normal position and thereby releasing said tire, and means for returning said carriage and therewith said wheel and tire to the starting position.

References Cited in the file of this patent
UNITED STATES PATENTS

| | | |
|---|---|---|
| 2,506,007 | Winstead | May 20, 1950 |
| 2,635,682 | Rerick et al. | Apr. 21, 1953 |
| 2,712,350 | Henderson | July 5, 1955 |